United States Patent
Garcia et al.

(10) Patent No.: US 9,071,973 B2
(45) Date of Patent: Jun. 30, 2015

(54) COMMUNICATION NETWORK AND METHOD

(75) Inventors: Luis Garcia, Aalborg (DK); Gustavo Wagner, Aalborg (DK); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/582,554

(22) PCT Filed: Mar. 1, 2010

(86) PCT No.: PCT/EP2010/052544
§ 371 (c)(1),
(2), (4) Date: Oct. 2, 2012

(87) PCT Pub. No.: WO2011/107140
PCT Pub. Date: Sep. 9, 2011

(65) Prior Publication Data
US 2013/0022000 A1    Jan. 24, 2013

(51) Int. Cl.
*H04W 4/00* (2009.01)
*H04W 16/10* (2009.01)

(52) U.S. Cl.
CPC .................................... *H04W 16/10* (2013.01)

(58) Field of Classification Search
USPC ................. 370/203, 206, 328–339, 431–432, 370/436–437, 441
See application file for complete search history.

(56) References Cited

U.S. PATENT DOCUMENTS

| | | | |
|---|---|---|---|
| 8,391,882 B2* | 3/2013 | Sampath et al. | 455/454 |
| 2009/0310554 A1 | 12/2009 | Sun et al. | 370/329 |
| 2010/0130248 A1* | 5/2010 | Schmidt | 455/553.1 |
| 2012/0108283 A1* | 5/2012 | Pedersen et al. | 455/509 |
| 2013/0003580 A1* | 1/2013 | Kovacs et al. | 370/252 |

FOREIGN PATENT DOCUMENTS

| | | |
|---|---|---|
| EP | 2 073 587 A2 | 6/2009 |
| EP | 2 083 590 A2 | 7/2009 |

OTHER PUBLICATIONS

Garcia et al, Autonomous Component Carrier Selection: Interference Management in Local Area Environments for LTE-Advanced, IEEE, 7 pages, Sep. 2009.*
Garcia et al, Self-Organizing Coalition for Conflic Evaluation and Resolution in Femtocells, IEEE, 6 pages, 2010.*
3GPP TSG RAN WG1 #59 Meeting, R1-094659, Jeju, South Korea, Nov. 9-13, 2009, Nokia Siemens Networks, Nokia, "Autonomous CC Selection for Heterogeneous Environments", 7.7.3.

(Continued)

*Primary Examiner* — Frank Duong
(74) *Attorney, Agent, or Firm* — Harrington & Smith

(57) ABSTRACT

A method, apparatus and computer program for allocating resources in a communication system. An access node sends a request for shared resources to one or more neighboring access nodes which have a strong interference bond with the access node. The neighboring access nodes send a response identifying the nature of their use of the shared resources. The access node then determines a new allocation of the shared resources based on the responses. This new allocation is then signalled to the neighboring access nodes.

26 Claims, 11 Drawing Sheets

(56) References Cited

OTHER PUBLICATIONS

3GPP TSG RAN WG1 #55-bis Meeting, R1-090235, Ljubljana, Solvenia, Jan. 12-16, 2009, Nokia Siemens Networks, Nokia, "Use of Background Interference Matrix for Autonomous Component Carrier Selection for LTE-Advanced", 12.2.

"LTE Capacity Compared to the Shannon Bound", P. Mogeneson et al., UEEE VTC2007-Spring, pp. 1234-1238, 2007.

* cited by examiner

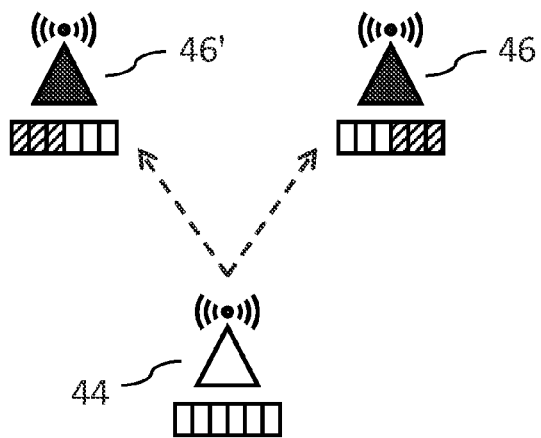 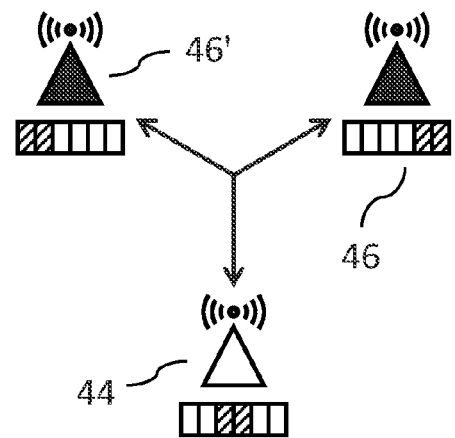
Fig 9(a)        Fig 9(b)
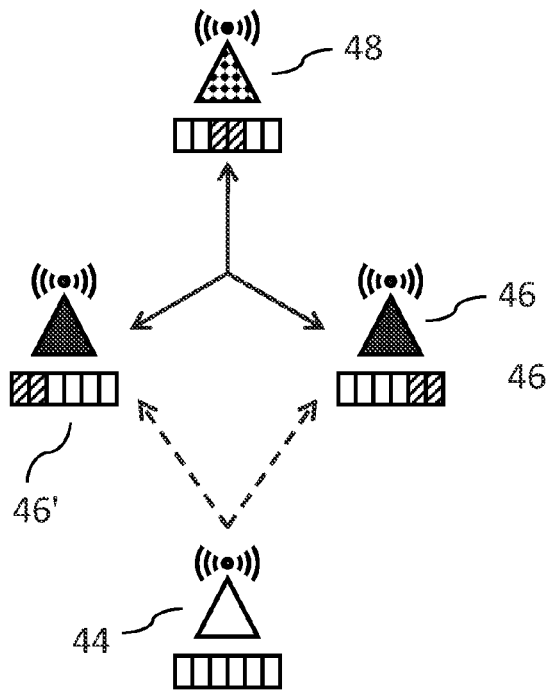 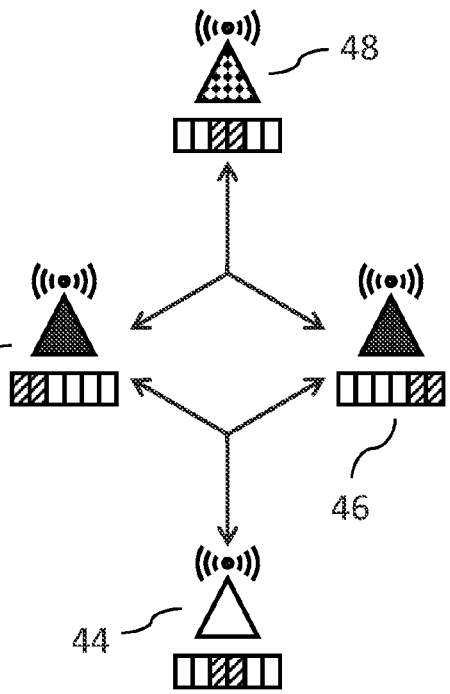
Fig 10(a)        Fig 10(b)

COMMUNICATION NETWORK AND METHOD

BACKGROUND OF THE INVENTION

1) Field of the Invention

Embodiments of the invention relate to communications apparatuses, networks and systems, as well as methods and computer programs for the same.

2) Description of Related Art

A communication system can be seen as a facility that enables communication sessions between two or more entities. The communications may comprise, for example, communication of voice, electronic mail (email), text message, multimedia, other data and so on. A communication system can be provided, for example, by means of a communication network and one or more compatible communication devices. The communication network may be a local network.

A user can access a communication system by means of an appropriate communication device. A communication device of a user is often referred to as user equipment (UE). A communication device is provided with an appropriate signal receiving and transmitting apparatus for enabling communications with a communication network or communications directly with other users.

Cellular communication systems are those in which a communications device is able to wirelessly communicate with a network. In such cellular systems a network entity, often called a base station, Node B or evolved Node B (eNB)—collectively access nodes—provide a node for communication with the communication device in one or more cells or sectors. Each access node may provide one cell in the area surrounding it. Alternatively an access node may provide a plurality of cells by dividing the area surrounding it into a plurality of sectors.

The cells in a cellular communication system may overlap. They may be of differing sizes. One large cell may cover a geographic area which additionally contains a plurality of smaller cells.

Typically the access nodes are connected to a wider communications network. This communications network may have connections to further communications networks, including the Internet.

The bandwidth available for transmissions between a device and an access node generally comprises a plurality of component carriers; and each transmission is made on one or more selected component carriers. Component carriers represent a bundle of resources, and may be narrow (i.e. few resources) or wide (many resources).

The use of the same component carriers by neighbouring access nodes (defining neighbouring, superimposed or overlapping cells) is dependent on the interference coupling between the access nodes. Interface coupling is indicative of the degree that the communications of a first access node will interfere with the communications of a second access node. This can be derived from measurements of the signal to interference plus noise ratio (SINR) of communications with a particular access node.

When a first access node is using a particular component carrier, the interference coupling between the first access node and a neighbouring access node describes the effect that the use of the component carrier by the first access node has on the SINR at the neighbouring access node. The interference coupling may be sufficiently high (and the SINR sufficiently low) that the particular component carrier is effectively unavailable to the same neighbouring access node.

There are a finite number of component carriers, and therefore, to avoid each access node adversely affecting the SINR of its neighbouring access nodes, the component carriers are allocated between the access nodes in a given area.

It has been proposed that each access node automatically selects one and only one of the component carriers as its primary component carrier (PCC) or base carrier when the access node is powered on. The primary component carrier is used for essential functions such as setting up calls between the access node and a communication device; and it has been proposed to assure the quality of the PCC for any access node, and to make the reselection of a new component carrier as the PCC as infrequent as possible.

Each access node may also autonomously select one or more additional component carriers as secondary component carriers (SCC). The main purpose of secondary component carriers is to provide additional capacity whenever possible, and relatively frequent reselection by an access node of different carriers as its secondary component carrier(s) is envisaged. The component carriers may therefore be considered shared resources, which are shared between neighbouring access nodes.

It has been proposed that each access node maintains a so-called background interference matrix (BIM), which expresses this interference coupling between neighbouring access nodes. The BIM is built locally by each access node based on measurements from the communications devices that are served by the access node. The BIM describes the interference between neighbouring access nodes.

In proposals for the Long Term Evolution—Advanced (or LTE-A) standard for cellular communications, the selection of component carriers is performed autonomously using autonomous component carrier selection or ACCS.

ACCS may provide an automatic and fully distributed mechanism for dynamic frequency re-use on a component carrier resolution. In principle, each component carrier is eligible for use in any cell provided that certain signal to interference plus noise ratio (SINR) constraints are satisfied.

Under the proposals, heavily loaded cells are provided with more secondary component carriers than lightly loaded ones. The provision of secondary component carriers is performed on a "first come first served" basis. This is effective under low or moderate load conditions where the inherently time-varying nature of traffic in each cell will help accommodate the demand for extra component carriers.

However, under high load situations, especially within dense local area networks, the competition among neighbouring access nodes for more resources coupled to the lack of more elaborate rules governing access to component carriers, can result in some cells having a limited bandwidth.

Some cells may be left with nothing but their single primary component carriers since the minimal SINR constraints that all cells use during the SCC selection prevent the use of component carriers for which there is too great an extent of interference coupling. In other words, at high loads, the number of secondary component carriers allocated to each cell at any given moment is highly dependent on the time evolution, i.e. the order in which cells have attempted the allocation of extra component carriers, which can result in unfair allocation of resources between the different cells.

This may lead to the pre-emptive selection of secondary component carriers as there are no guarantees that a cell will still be granted access to secondary component carriers after the neighbouring cells have made their choices.

Alternatively, the SINR requirements for SCC selection could be set low from the start; nonetheless this approach may entail cells sacrificing the quality (in terms of SINR) of their SCCs for the sake of the network even when it is not necessary.

BRIEF SUMMARY OF THE INVENTION

According to a first aspect of the invention there is provided a method comprising: determining that additional shared resources are required by a first node, the shared resources being shared with one or more second nodes; determining the identity of at least one of the one of more second nodes with which the first node has a strong interference bond for the shared resources; and causing at least one allocation message to be sent to the at least one second node, the allocation message indicating that at least a part of the shared resources used by the at least one second node has been allocated to the first node.

Optionally the first node forms a coalition with the at least one second node based on information sent in the at least one allocation message.

Optionally the method further comprises: sending a request to the at least one second node for information relating to the use of the shared resources. Optionally the method further comprises: receiving a response from the at least one second node, the response comprising information relating to the use of the shared resources.

Optionally the response comprises at least one of: information relating to what shared resources are being used by the at least one second node; information relating to what shared resources, used by the at least one second node, may be allocated to the first node; information relating to whether the at least one second node forms a coalition with one or more further nodes.

Optionally the method further comprises: determining based on the response, whether there are free shared resources which are free to be used by the first node; wherein, if there are free resources, the at least one allocation message comprises information identifying the free shared resources.

Optionally the method further comprises: receiving information defining interference bonding between the first node and the at least one second node; storing the received information in a memory, wherein the determining the identity of at least one second node comprises reading information from the memory. Optionally the received information is received from a communication device with which the first node is able to communicate using the shared resources.

Optionally an interference bond represents the amount which the signalling associated with the shared resource and the at least one second access node affects the signalling associated with the shared resource and the first node.

Optionally a strong interference bond is indicative that the interference bond renders simultaneous use of the shared resource by the first and the at least one second node less efficient than coordinated use of the shared resource.

Optionally the shared resources comprise portions of component carriers. Optionally the portions of component carriers are orthogonal within the time domain.

Optionally the at least one second node comprises two second nodes and wherein the first node is allocated a first part of the shared resources, one second node is allocated a second part of the shared resources, and a further second node is allocated a third part of the shared resources.

According to a second aspect of the invention there is provided a computer program product embodied on a computer readable medium which contains computer readable instructions which when performed on one or more processors perform the method as described above.

According to a third aspect of the invention there is provided n apparatus comprising: determining means for determining that additional shared resources are required by a first node, the shared resources being shared with one or more second nodes; and for determining the identity of at least one of the one of more second nodes with which the first node has a strong interference bond for the shared resources; and means for causing at least one allocation message to be sent to the at least one second node, the allocation message indicating that at least a part of the shared resources used by the at least one second node has been allocated to the first node.

Optionally the first node is configured to form a coalition with the at least one second node based on information sent in the at least one allocation message.

Optionally the apparatus further comprises: means for sending a request to the at least one second node for information relating to the use of the shared resources. Optionally the apparatus further comprises: means for receiving a response from the at least one second node, the response comprising information relating to the use of the shared resources.

Optionally the response comprises at least one of: information relating to what shared resources are being used by the at least one second node; information relating to what shared resources, used by the at least one second node, may be allocated to the first node; information relating to whether the at least one second node forms a coalition with one or more further nodes.

Optionally determining means is configured to determine, based on the response, whether there are free shared resources which are free to be used by the first node; and wherein, if there are free resources, the at least one allocation message comprises information identifying the free shared resources.

Optionally the apparatus further comprises: means for receiving information defining interference bonding between the first node and the at least one second node; a memory for storing the received information, wherein the determining means comprises means for reading the information from the memory.

Optionally the means for receiving information defining interference bonding between the first node and the at least one second node is configured to receive information from a communication device with which the first node is able to communicate using the shared resources.

Optionally an interference bond represents the amount which the signalling associated with the shared resource and the at least one second access node affects the signalling associated with the shared resource and the first node.

Optionally a strong interference bond is indicative that the interference bond renders simultaneous use of the shared resource by the first and the at least one second node less efficient than coordinated use of the shared resource.

Optionally the shared resources comprise portions of component carriers. Optionally the portions of component carriers are orthogonal within the time domain.

Optionally the at least one second node comprises two second nodes and wherein the first node is allocated a first part of the shared resources, one second node is allocated a second part of the shared resources, and a further second node is allocated a third part of the shared resources.

Optionally the first node and the at least one second node comprise eNodeBs.

According to a fourth aspect of the invention there is provided a first node comprising the apparatus described above.

According to a fifth aspect of the invention there is provided a communications system comprising a first node, at least one second node and the apparatus described above.

BRIEF DESCRIPTION OF THE SEVERAL VIEWS OF THE DRAWINGS

For a better understanding of the present invention and how the same may be carried into effect, reference will now be made by way of example only, and to the accompanying drawings in which:

FIGS. 7a to 12b show possibilities for determining new allocations according to embodiments of the invention;

DETAILED DESCRIPTION OF THE INVENTION

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

Figure 1:
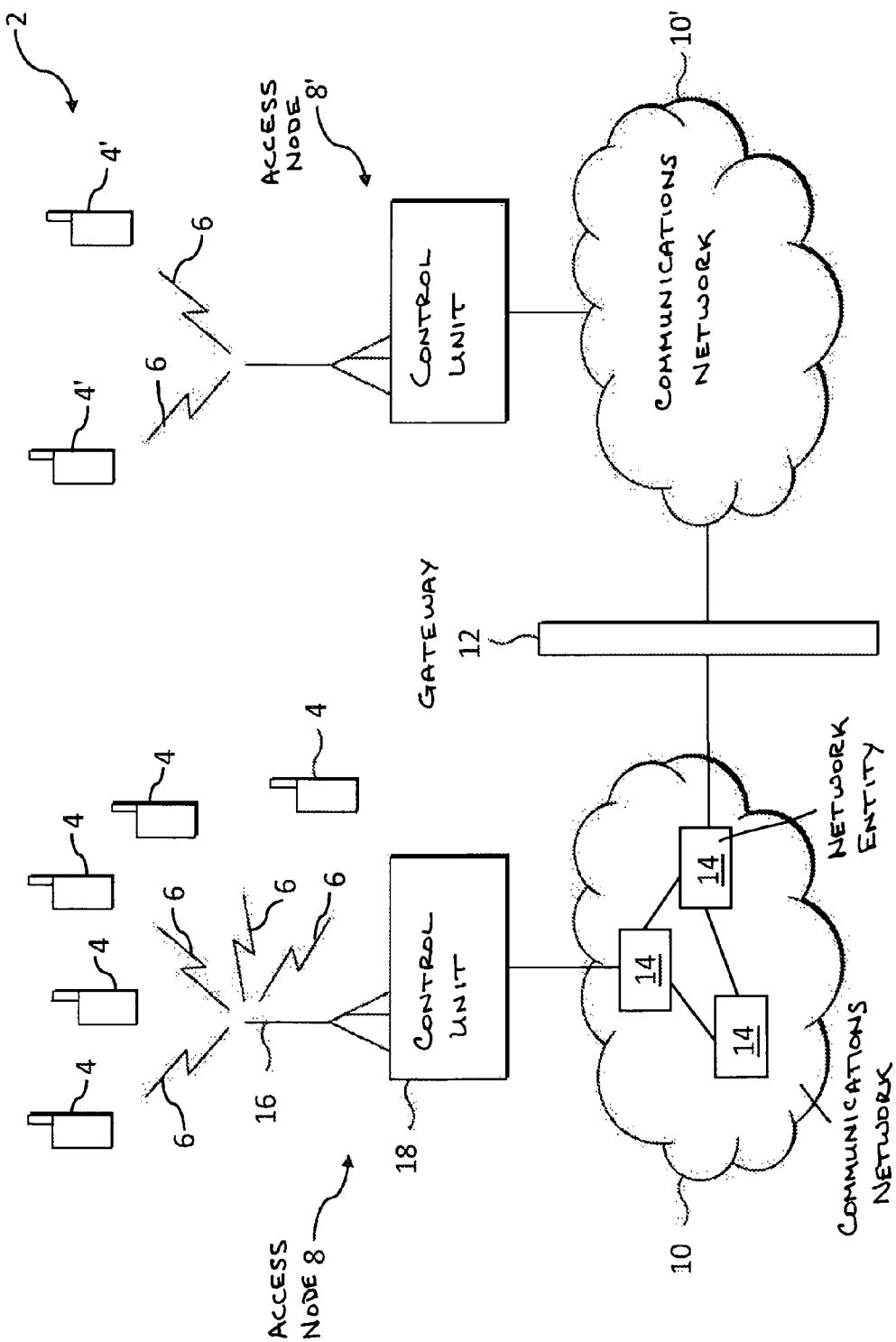
FIG. 1 shows an example of a communication system in which embodiments of the invention may be implemented.

FIG. 1 shows a communications system 2. Within this communications system 2 one or more communication devices 4 can be used for accessing various services and/or applications provided via or within the communication system 2. In the figure, mobile communication devices 4 communicate with an appropriate access node 8 via wireless interfaces 6.

Access node 8 can be configured to provide a cell, but can also provide, for example, three sectors, each sector providing a cell. Each mobile communication device 4 and the access node 8 may have one or more radio channels open at the same time and may receive signals from more than one source.

The access node 8 is connected to communications network 10. A gateway function 12 may be provided facilitate communications between the communications network 10 and a further communications network 10'. The other network 10' may be any appropriate network. For example the other network 10' may be another communication network, such as the one shown, containing an access node 8' and communications devices 4' connected via wireless interfaces 6'. Alternatively, the other network 10' may be a packet data network such as the Internet.

The communication system 2 may thus be provided with one or more interconnected networks 10, 10' and the elements thereof.

An access node 8 may communicate with one or more network entities 14 within the communications network 10. These network entities 14 may be interconnected within the communications network 10. Each of the network entities 14 may be a single unit, or may have its functions distributed over a plurality of units. The network entities 14 may be assigned different functions, for example one network entity may communicate with other communications networks, such as communications network 10', via gateway 12. A further network entity may be configured to communicate with one or more access nodes 8.

The network entities 14 may serve to control the access node 8 so as to enable operation thereof and management of the communication devices 4 in communication with the access node 8. However, in certain communication systems such as autonomous systems there may be no control entities.

Non-limiting examples of appropriate access nodes 8 are an access node of a cellular system, for example what is known as a base station, Node B or enhanced NodeB (eNB) in the vocabulary of the 3GPP specifications. Other examples include access nodes of systems that are based on technologies such as wireless local area network (WLAN) and/or WiMax (Worldwide Interoperability for Microwave Access).

The communication devices 4 can communicate with the access node 8 using various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on.

An example of the more recent developments in the standardization is the long-term evolution (LTE) of the Universal Mobile Telecommunications System (UMTS) radio-access technology that is being standardized by the 3rd Generation Partnership Project (3GPP). A further development of the LTE is referred to as LTE-Advanced. Other techniques may be used such as orthogonal frequency divisional multiple access (OFDMA) and SCFDMA, for downlink and uplink operation respectively.

The access node 8 may comprise one or more antennas 16 connected to control apparatus 18. The antenna 16 may communicate with communication devices 4 via wireless interfaces 6. The control unit 18 may perform a plurality of functions to facilitate the communications with both the communications devices 4 and the network 10. The functionality of the control unit 18 of the access node 8 will be described in more detail with reference to FIG. 3.

Figure 2:
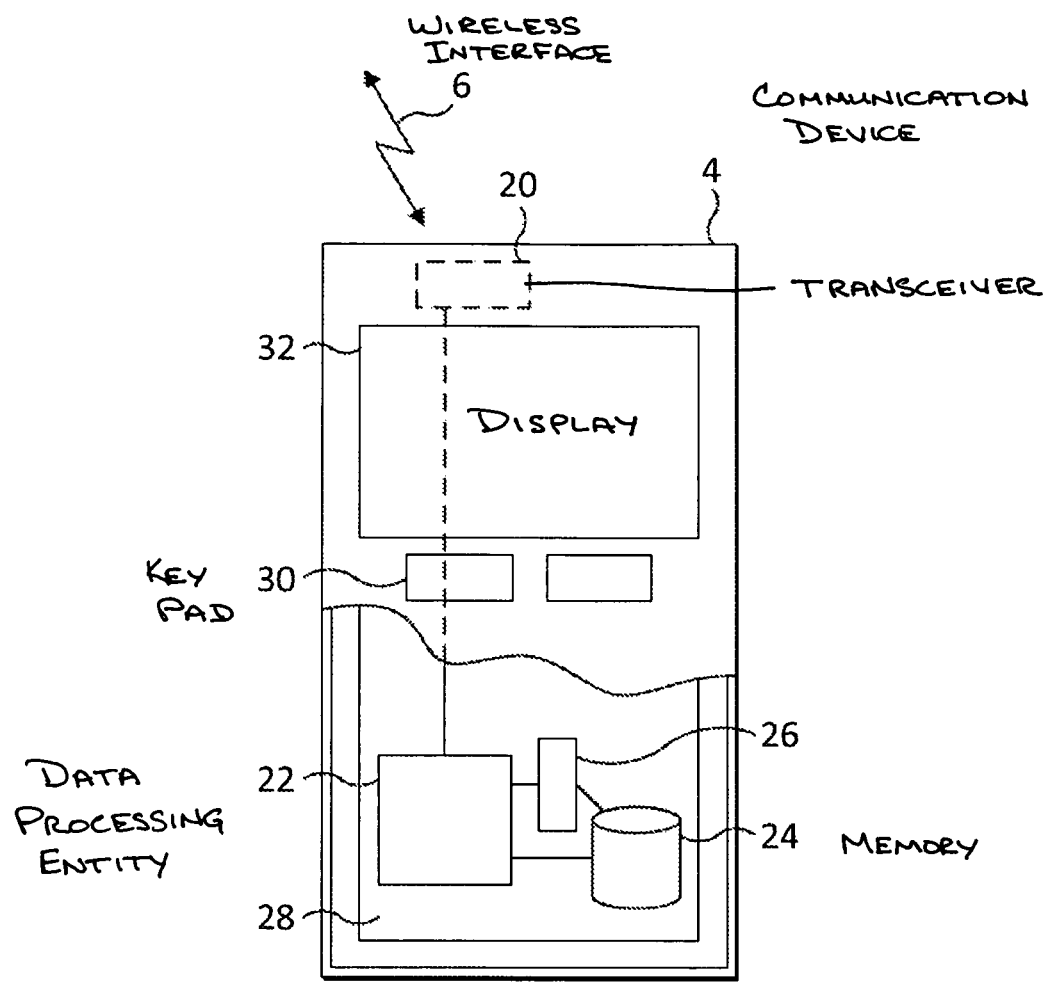
FIG. 2 shows an example of a communication device.

FIG. 2 shows a schematic, partially sectioned view of a communication device 4 that can be used for communication with an access node 8 within the communication system 2. An appropriate communication device 4 may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The communications device 4 may transmit and receive signals over an air interface 6 via a transceiver, designated schematically by block 20. The transceiver may be provided for example by means of one or more radio parts and one or more associated antenna arrangements. The antenna arrangements may be arranged internally or externally to the communications device 4.

The communications device 4 may also be provided with at least one data processing entity 22, at least one memory 24 and other possible components 26 for use in software aided execution of tasks it is designed to perform, including control of access to and communications with access systems. The data processing, storage and other relevant control apparatus can be provided on an appropriate circuit board and/or in chipsets. This feature is denoted by reference 28.

The user may control the operation of the mobile device by means of a suitable user interface such as key pad 30, voice commands, touch sensitive screen or pad, combinations thereof or the like. A display 32, a speaker and a microphone are also typically provided. Furthermore, a mobile communication device may comprise appropriate connectors (either wired or wireless) to other devices and/or for connecting external accessories, for example hands-free equipment, thereto.

Figure 3:
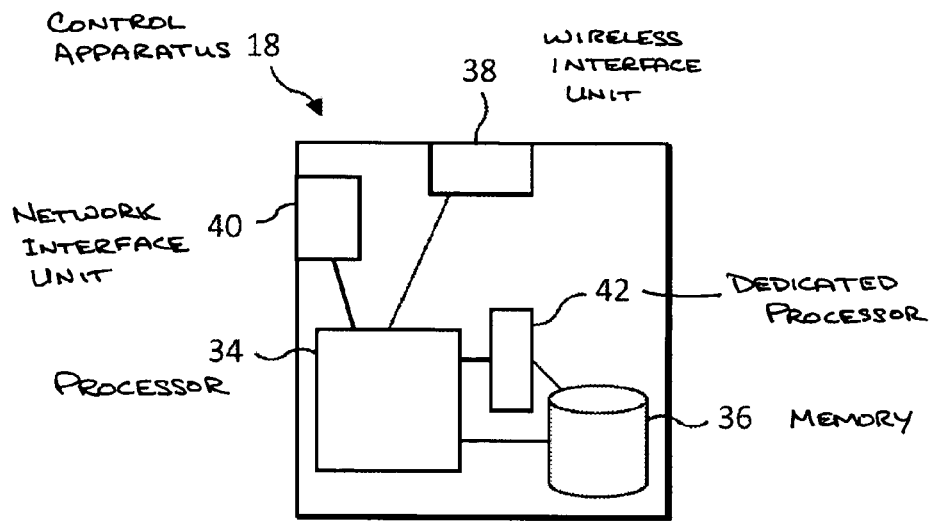
FIG. 3 shows an example of a control unit for an access node

FIG. 3 shows an example of a control apparatus 18 for an access node 8. The control apparatus 18 may be configured to implement some of the embodiments of the invention. The control apparatus 18 may contain a processor 34 connected to a memory 36. The processor may perform some of the functions of the invention based on computer instructions contained in the computer readable memory 36.

The processor 34 may be connected to an wireless interface unit 38 for communicating with the antenna 16 (not shown in FIG. 3) of the access node 8. The wireless interface unit 38 may comprise a transceiver unit capable of performing signal processing required for communication over the air interface with communications devices 4. The control apparatus 18 of the access node 8 is able to communicate with the communication devices 4 via the antenna 16. Alternatively or additionally the control apparatus 18 may communicate with other access nodes via the antenna 16.

In addition the control apparatus 18 may comprise a network interface unit 40 connected to processor 34 for communicating with the network 10. This communication with the network 10 may be via a fixed network or via a wireless link. The control apparatus 18 of the access node 8 may communicate with other access nodes via the network 10.

The control apparatus 18 may further be provided with a dedicated processor 42. The dedicated processor 42 may be connected to the processor 34, the memory 36 and any other units within the control apparatus 18 so that it may perform its function. The dedicated processor 42 may be optimized for performing certain processor intensive tasks such as digital signal processing. Alternatively the dedicated processor 42 may be designed to perform certain low level tasks, such as memory arbitration.

It will be understood that the above description of a control apparatus 18 for an access node 8 is purely exemplary and functional. As such there may be provided more than one of any of the processor 34, memory 36, interface units 38 and 40 and dedicated processor 42. Equally these element may be interconnected in any manner required for them to perform their function.

Figure 4:
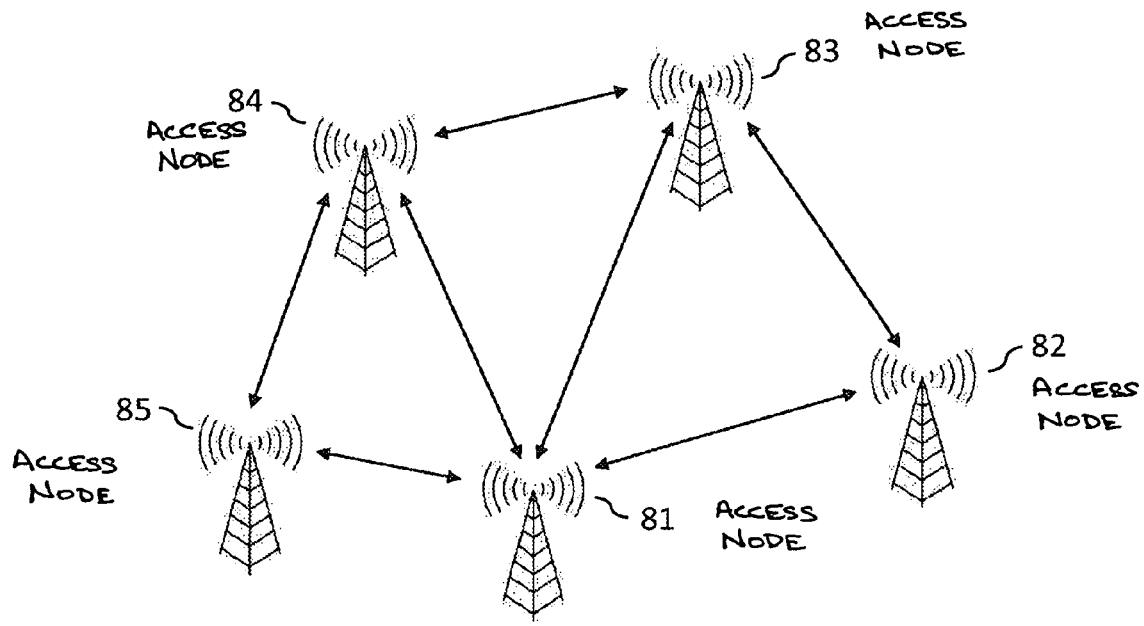
FIG. 4 shows a schematic representation of an autonomous communication network.

FIG. 4 shows an arrangement of access nodes 81, 82, 83, 84 and 85. It will be understood that the five access nodes present are only exemplary and more or fewer access nodes may be present in alternative embodiments of the invention.

The lines connecting the access nodes 81-85 represent a strong interference bonding between the access nodes. It can be seen that access node 81 has a strong interference bonding with all four of the other access nodes. By contrast, access node 82 has strong interference bonding with only access node 81 and 83. Access node 83 has strong interference bonding with access nodes 81, 82 and 84. Access node 84 has strong interference bonding with access nodes 81, 85 and 83. Finally access node 85 has strong interference bonding with access nodes 81 and 84.

Interference bonding represents the level of interference between the two access nodes. In particular interference bonding represents the amount which the signalling associated with one access node may affect the signalling of a further node in case of simultaneous transmission using the same resource. The interference bonding may be measured in terms of the SINR, or by any other relevant measurement.

Strong interference bonding is used to represent the condition that the interference bonding between two access nodes is above a certain threshold. This threshold may be predetermined, or calculated from other network parameters. In some embodiments, strong inference bonding may represent the condition that the interference bonding is such that the spectral efficiency of the two nodes (that is the amount of data that can be transmitted and received over the air interface by the two access nodes) is higher if they split the resource into two orthogonal halves (e.g. in time), one for each node, rather than both using integral resource simultaneously. In other words, the aggregate spectral efficiency of the two access nodes using the same (and therefore interfering) component carrier may be less than the aggregate spectral efficiency of both nodes using a component carrier without interference for half of the time. In alternative embodiments, a different measure of strong interference bonding may be used.

In some embodiments, a strong interference bond is determined by a bidirectional relation between two access nodes. Let two neighbour access nodes be denoted by eNB-A and eNB-B. If eNB-A and eNB-B are the only ones sharing a particular resource, the expected SINR is given by the BIM matrix values. The estimations rely on the BIM and may include a priori characterization of system level performance as described in, for example, P. Mogensen, W. Na, I. Kovács, et al., "LTE Capacity compared to the Shannon Bound", IEEE VTC2007-Spring, pp. 1234-1238, 2007. The smallest SINR value found in the BIM from/towards the neighbouring cell may be used as input to the Shannon-like formula described in the document referenced above. This general method facilitates low-complexity yet effective predictions of the spectral efficiency of any cell given the perceived SINR. The information both cells see is identical given the way the BIM is created in this embodiment.

Mathematically, strong bonding exists if:

$$\tfrac{1}{2}[SE(SINR_A)+SE(SINR_B)] \geq SE(SINR_{A|B})+SE(SINR_{B|A})$$

where:
SE( ) represents the spectral efficiency as a function of SINR;
$SINR_A$ represents the SINR of a signals to/from eNB-A in the absence of eNB-B;
$SINR_B$ represents the SINR of a signals to/from eNB-B in the absence of eNB-A;
$SINR_{A|B}$ is taken from the BIM and represents the SINR of a signals to/from eNB-A in the presence of eNB-B;
$SINR_{B|A}$ is taken from the BIM and represents the SINR of a signals to/from eNB-B in the presence of eNB-A.

If the SINR values of both access nodes are low, the spectral efficiency of the whole is higher if each access node uses a orthogonal share of the original resource. Otherwise, if the SINR values are high, the spectral efficiency is higher if the two access nodes simply reuse the resources, that is, use the same component carrier without any restrictions.

In the above example, the BIM is used to estimate the SINR and the SINR is used to determine the degree of interference bonding. However this is only exemplary and in alternative embodiments any other suitable measurements may be used.

The BIM, SINR or other measurements may be stored in the memory 36 as shown in FIG. 3. Alternatively the information may be received from any appropriate entity in the network.

The background interference matrix (BIM) is described in 3GPP Tdoc R1-090235, "Use of Background Interference Matrix for Autonomous Component Carrier Selection for LTE-Advanced", Nokia Siemens Networks, Nokia.

As will be described in more detail below, embodiments of the invention propose creating coalitions of access nodes. These coalitions of access nodes may use the same component carrier or carriers, but form a coalition so as to use the component carrier in a non-interfering, that is orthogonal, manner. This may maximize the spectral efficiency of the air interface.

The component carrier(s) may be shared by the access nodes within a coalition using a form of time division access. That is, one access node will be able to use the component carrier for a specified period, and then the component carrier will be made available to one or more of the other access nodes within the coalition. Alternative mechanisms for sharing the component carrier between the access nodes of a coalition may be used. The access nodes may signal to each other to coordinate the sharing of the resources in the coalition.

The nature of the coalition, that is the identities of the access nodes within it and the component carriers which may be used by an individual access node may be stored in the memory 36.

A coalition table may be stored for each access node. Each access node may keep a coalition table for each allocated SCC, containing the list of current coalitions and the corresponding allocation restrictions.

Equally, the access nodes are able to communicate with each other to form and break down these coalitions. This signalling may be done over the air interface, that is via wireless interface 38, or via a fixed network, that is via network interface 40.

A method according to an embodiment of the invention will now be described with reference to FIG. 5.

The step S0 an access node (henceforth the originating access node) determines whether it requires additional capacity, that is, one or more additional component carriers to communicate over. This decision block is self looping until the determination is true. As described above, the component carriers are considered shared resources, since they may be used by any access node.

In step S1, having determined that additional capacity is required, the originating access determines which neighbouring access nodes have a strong interference bonding with the originating access node. This step may include accessing information stored in memory 36 such as the SINR or BIM. Alternatively this step may include receiving information via one or more of the interfaces.

In step S2, the originating access node selects one or more component carriers to form the basis of one or more coalitions. Within each coalition the one or more component carriers may be shared, so that the use of the resources is orthogonal, that is non-interfering.

The component carriers may be selected by a number of different methods. In some embodiments the component carriers may be selected based on the number of interfering neighbouring access nodes which do, or do not, use those component carriers. Alternatively, if the component carriers encompass different bandwidths, the selection may be based on the available bandwidth in the component carrier(s).

In some embodiments, the originating access node will communicate (and therefore form coalitions) with all neighbouring access nodes with which there is a strong interference bond. Alternatively the originating access node may only communicate with those neighbouring access nodes which are using the selected component carrier(s).

These neighbouring access nodes with which the originating access node communicates will henceforth be identified as interfering neighbouring access nodes. For simplicity, in FIG. 5, only one interfering neighbouring access node is shown. However, embodiments of the invention will include situations where there is more than one interfering neighbouring access node. Equally, reference below to the interfering neighbouring access node in either the plural or singular is intended to encompass situations with any number of interfering neighbouring access nodes.

In step S3, a coalition formation request message (CFR) is sent by the originating access node to the interfering neighbouring access nodes determined in step S1. Each coalition formation request message may include the identification of the originating access node, the identification of the interfering neighbouring access nodes and an identification of one or more selected component carriers. In this step the CFR may be sent to all of the interfering neighbouring access nodes. Alternatively, the CFR may be sent to only those interfering neighbouring access nodes which are using the selected resources, i.e. the selected component carrier(s).

In step S4, the coalition formation requests are received by the interfering neighbouring access nodes.

In step S5 the interfering neighbouring access nodes determine the extent of any existing coalitions that they are a part of. This may include determining what resource restrictions are already in place due to these existing coalitions. Equally the interfering neighbouring access nodes may determine if they form a coalition with the other interfering neighbouring access nodes identified in the CFR.

In step S6 coalition formation reply messages (CFY) are sent by the interfering neighbouring access nodes to the originating access node. Each coalition formation reply message may include the identification of the interfering neighbouring access node sending the CFY, the identification of the originating access node, the resource restriction set by existing coalitions which the interfering neighbouring access node sending the CFY is a part of and an indication of whether any of the interfering neighbouring access nodes identified in the CFY are already part of a coalition.

In step S7 the originating access node receives the CFYs.

In step S8 the originating access node determines a new allocation for the resources. This step is expanded on in more detail below.

In step S9 coalition formation acknowledgment messages (CFA) are sent from the originating access node the interfering neighbouring access nodes. The CFA contains the identification of the originating access node, the identification of the interfering neighbouring access nodes, the new coalitions formed and the new resource division.

In step S10 the CFAs are received at the interfering neighbouring access nodes.

In step S11 the access nodes update their coalition formation tables, according to the allocation determined in step S8.

The CFA may be sent to only a subset of the interfering neighbouring access nodes. This may be because one or more of the interfering neighbouring access nodes is unaffected by the new allocations and therefore does not require a CFA. Equally the CFA may be sent to more than just the interfering neighbouring access nodes since the new allocations may affect access nodes beyond the interfering neighbouring access nodes, for example when the interfering neighbouring access nodes are part of a coalition themselves.

Alternatively, in some embodiments, when an interfering neighbouring access node receives a CFA message, it may broadcast the changes in allocation and coalitions (specified in the CFA message) to the access nodes with which it forms coalitions. These access nodes may not form coalitions with the originating access node, and therefore may not have received the CFA. Alternatively, in other embodiments there may be regular signalling between the members of a coalition, and the changes may be signalled on a regular update.

Figure 5:
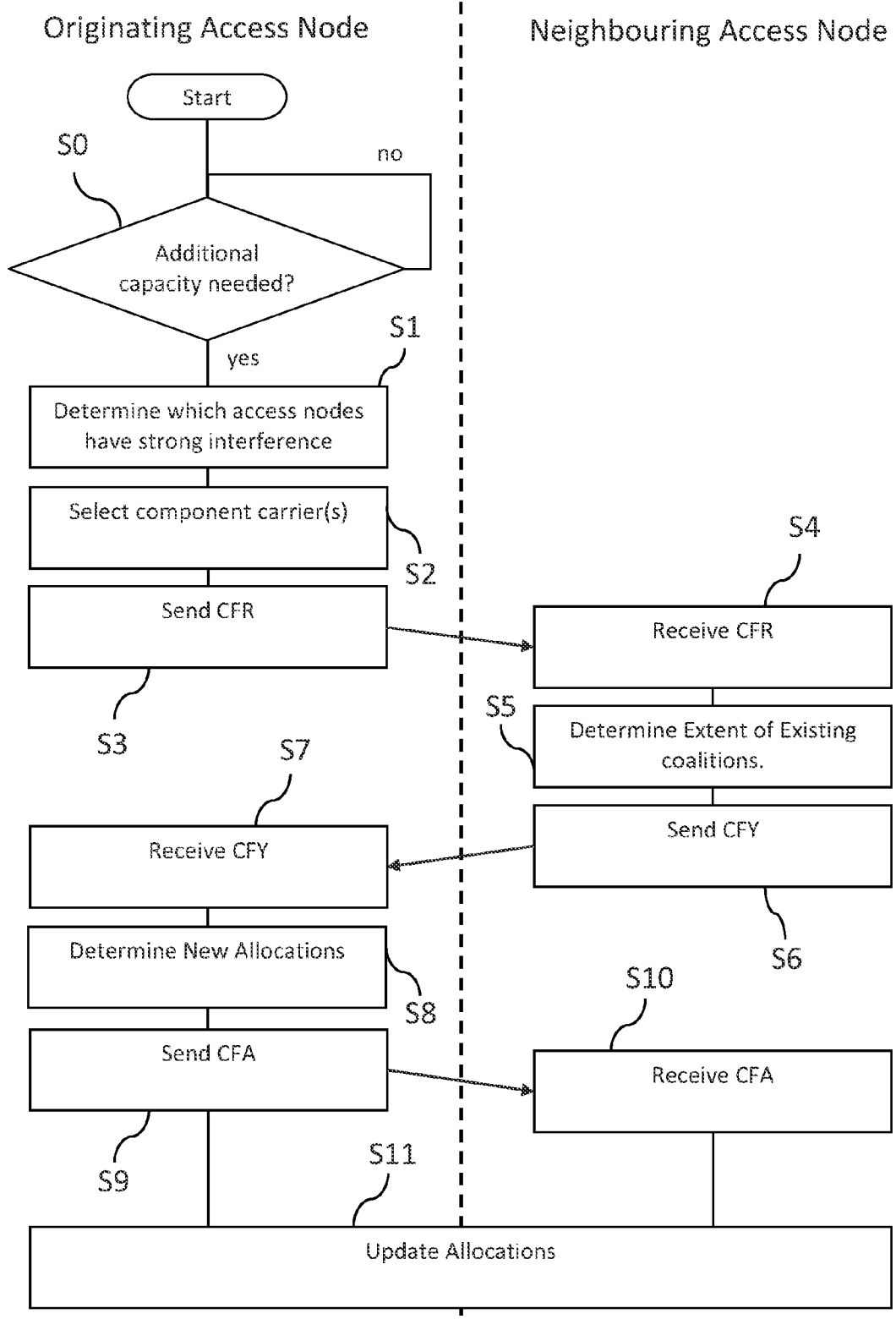
FIG. 5 shows a method of allocating capacity according to embodiments of the invention.

In some embodiments of the invention, the messages sent (i.e. the CFR, the CFA and the CFY) may be acknowledge by the receiver (these messages are not shown in FIG. 5). The acknowledgement messages may be a 200OK message or any similar message dependent on the signalling protocol used.

The determination of the new allocation in step S8 has been described as being performed by the originating access node. However this determination can be done by any relevant entity.

In alternative embodiments of the invention, the above method may be adapted to include a control node. This control node may receive the CFR from the access node, and respond using the CFA. The control node may send out its own CFR messages to the interfering neighbouring access nodes, and receive CFY messages from them. Alternatively the control node may store the information on existing coalitions and the like and therefore is not required to communicate with the interfering neighbouring access nodes before determining the new allocation.

In some embodiments the control node may be provided with information regarding the resource needs and usage of one or more of the access nodes, and be able to change the allocation of the shared resources without receiving a CFR. In this case, only a CFA message changing the allocations of access nodes may be sent.

Six examples of the possibilities for determining a new allocation of component carriers will now be described with reference to FIGS. 7 to 12. The examples are for maximum coalition sizes of 3, however the invention is not limited to this and the principles described below are applicable to coalitions of any size.

In each of FIGS. 7 to 12, an access node is shown performing the tasks of the originating access node as described above with reference to FIG. 5. The other access nodes shown are either interfering neighbouring access nodes as described above, or are access nodes which while not interfering with the originating access node, are part of coalitions formed with the one or more interfering neighbouring access nodes.

The white access nodes represent the originating access node and is provided with the reference numeral 44. The black access nodes represent the interfering neighbouring access nodes and are provided with the reference numerals 46 and 46' as applicable. The checked access nodes represent other access nodes which do not have a strong interference bond with the originating access node, that is they are not interfering neighbouring access nodes. These nodes are shown since they may form coalitions with one or more of the interfering neighbouring access nodes and are provided with reference numerals 48 and 48' as applicable.

In FIGS. 7 to 12, each access node is shown with a row of six boxes near them. These boxes are a schematic representation of the shared resources allocated to that access node. Each box represents a shared resource allocation, such as a portion of a single component carrier. The position of the box in the row represents a different portion. For example the left most box in each series represents the same portion. A shaded box represents that that portion is being used by the respective access node. An un-shaded box represents that that particular component carrier is not being used by the respective access node. While six portions of the component carrier are shown, it will be apparent that this is only exemplary and that more or fewer portions may be used. Equally, in some embodiments, the portions may span more than one component carrier, that is the portions of the shared resources are not limited to one component carrier.

It will be understood that the six portions generally relate to a secondary component carrier as described above. That is, the primary component carriers used by each access node are not shown. This does not preclude embodiments of the invention including a step in which primary component carriers are re-allocated.

FIGS. 7 to 12 show the CFR being sent as a dashed line. The response CFY and allocation message CFA as described above are not shown, however they are assumed to exist.

A coalition is represented by a solid line. Where the coalition is formed of three access nodes, the line is shown as three lines connected at a central point.

Figure 7A:
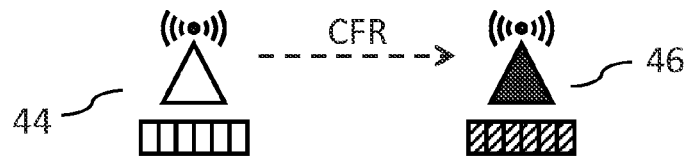
Figure 7B:
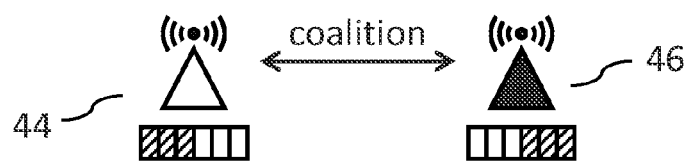

FIGS. 7a and 7b shows the case where there is only one interfering neighbouring access node. As shown in FIG. 7a, prior to any communications between the access nodes 44 and 46, the originating access node 44 has no allocation of the resources, while interfering neighbouring access node 46 has full allocation of the resources. As shown in FIG. 7a, the access node 44 sends a CFR to access node 46.

As a result of the signalling as described above the resources are equally divided, as shown in FIG. 7b. This is equivalent to augmenting a coalition of cardinality one to a coalition of cardinality two.

Figure 8A:
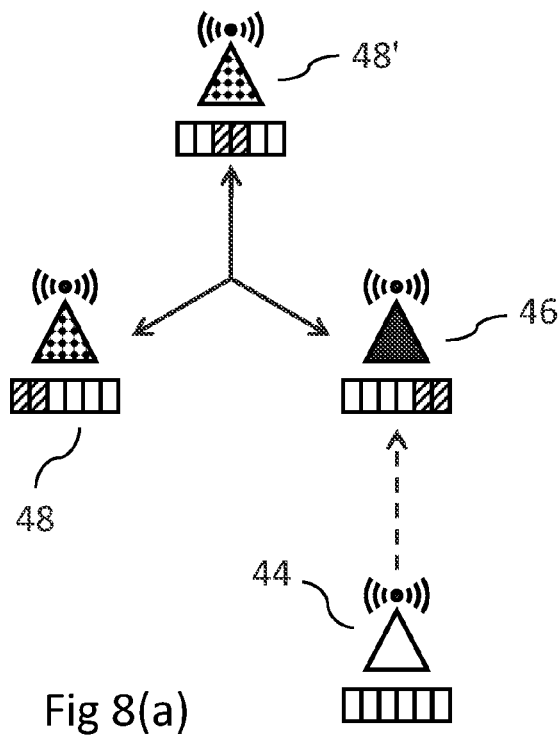
Figure 8B:
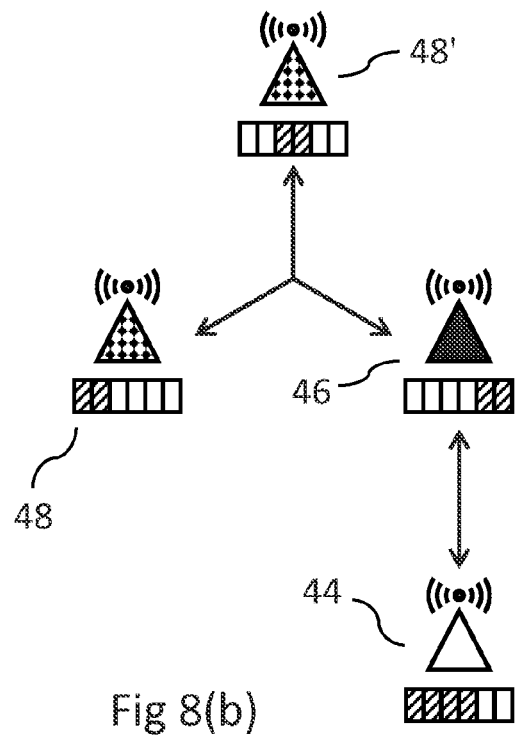

FIGS. 8a and 8b show the situation where there is only one interfering neighbouring access node 46, but that one neighbouring interfering access node already forms a coalition with two other access nodes 48 and 48'. The originating access node 44 sends the CFR request to only the interfering neighbouring access node 46, and receives a response from this one interfering neighbouring access node 46 accordingly. This scenario may be identified as a "free rider" situation, because the originating access node 44 is then allocated as many resources as is possible respecting the allocation of the one interfering neighbouring access node 46. This is shown in FIG. 4b. It will be apparent that in forming the coalition between the originating access node 44 and the interfering neighbouring access node 46, the coalition between the interfering neighbouring access node 46 and the other nodes 48 and 48' is unchanged. In general, a node is allowed to extend its resource allocation if this extension is possible respecting the allocation of all interfering neighbouring access nodes.

FIGS. 9a and 9b show a situation in which there are two interfering neighbouring access nodes 46 and 46' which are already forming a coalition. In this situation, the originating access node 44 sends a CFR to both interfering neighbouring access nodes 46 and 46'. The CFY is received from both interfering neighbouring access nodes and the CFA is again sent to both nodes.

Similar to the situation in FIG. 7b, the originating access node 44 augments the coalition of the interfering neighbouring access nodes 46 and 46'. However, in contrast to the coalition of cardinality two in FIG. 7b, the cardinality of the resultant coalition is three. In this case, the resources are divided equally amongst the three access nodes.

FIGS. 10a and 10b show a situation in which there are two interfering neighbouring access nodes 46 and 46'. In addition, these two interfering neighbouring access nodes 46 and 46' form a coalition of cardinality three with a further access node 48.

In this case, the CFR is again sent to both interfering neighbouring access nodes 46 and 46', the CFY received from the same two nodes, and the CFA is sent to both nodes.

However the resulting coalition, of cardinality three, between the originating access node 44 and the two interfering neighbouring access nodes 46 and 46' has spare capacity in the form of the capacity allocated to the further access node 48. This capacity can be allocated to the originating access node 44. Thus the situation is similar to the "free rider" situation described above in relation to FIGS. 8a and 8b in so far as the originating access node 44 is able to use the resources which the interfering neighbouring access nodes 46 and 46' are restricted from use due to their existing coalitions.

Figure 11A:
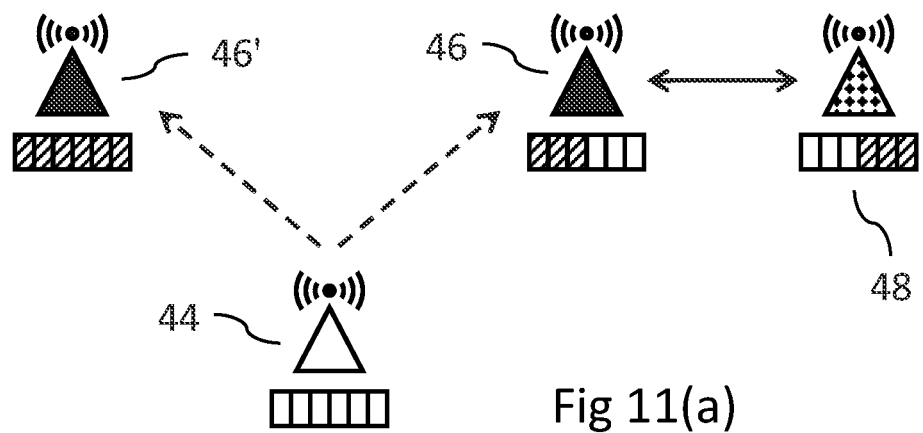
Figure 11B:
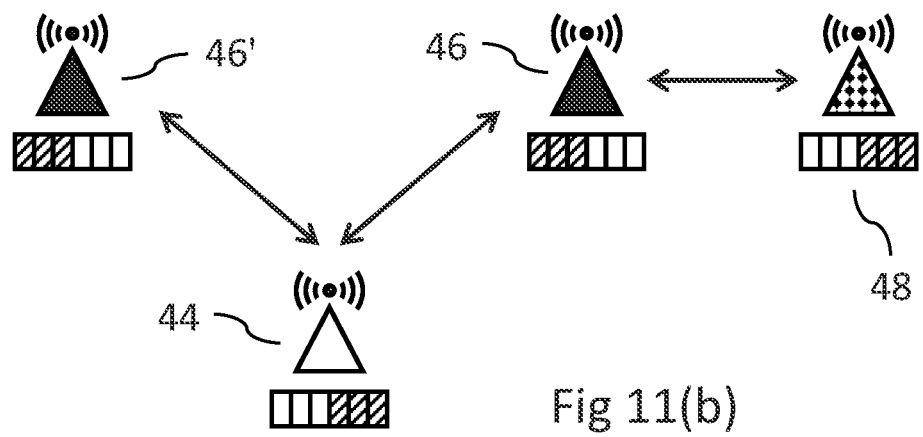

FIGS. 11a and 11b show a situation in which there are two interfering neighbouring access nodes 46 and 46' which are not part of the same coalition. Instead, interfering neighbouring access node 46 forms a coalition with access node 48, and interfering neighbouring access node 46' is not part of a coalition, that is it forms a coalition of cardinality one with itself.

In this case, two coalitions need to be made. The first between originating access node 44 and interfering neighbouring access node 46 and the second between the originating access node 44 and interfering neighbouring access nodes 46'. Each individual coalition may be considered in a similar manner to the augmentation described above with relation to FIGS. 7a and 7b. However, to maximise the spectral efficiency of the resultant coalitions, the originating access node will allocate resources so that each access node is allocated half the available resources. The originating node 44 is responsible of making its own allocation compatible with the allocations of nodes 46 and 46' in order to maximize the spectral efficiency.

Figure 12A:
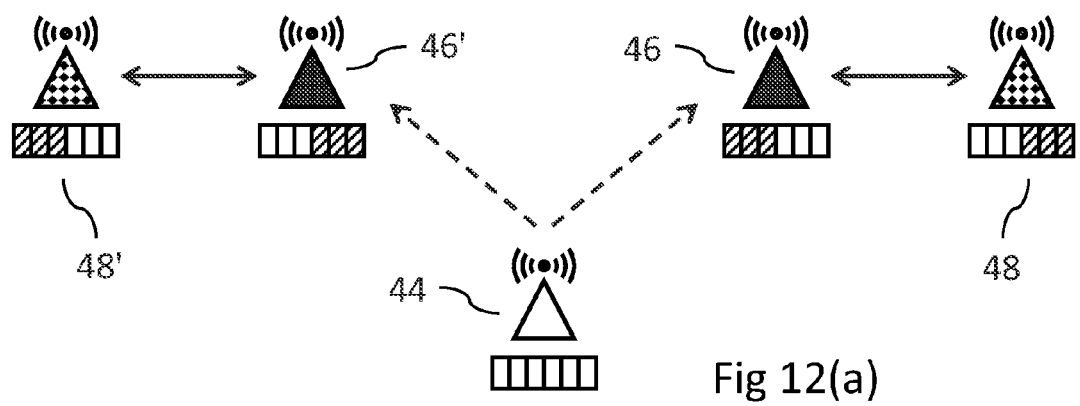
Figure 12B:
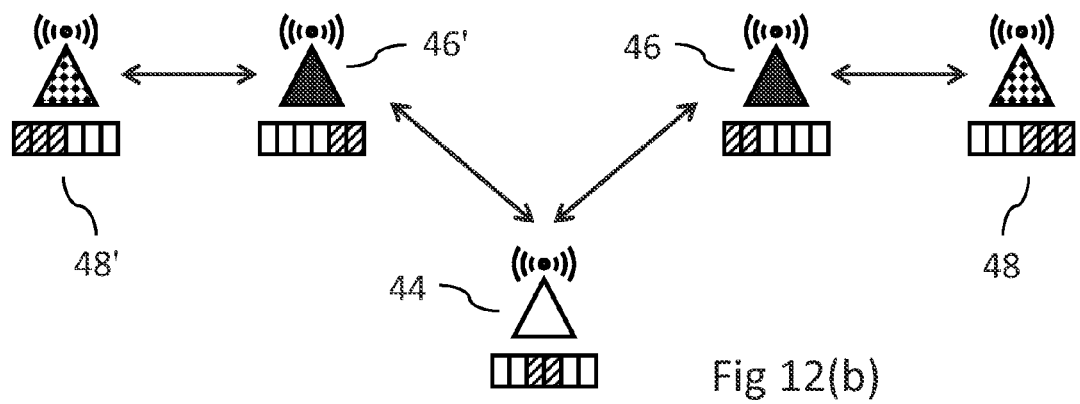

FIGS. 12a and 12b show the situation in which there are two interfering neighbouring access nodes 46 and 46'. Each interfering neighbouring access node is part of a coalition with a further access node, 48 and 48' respectively. In this case, the restrictions of the existing coalitions on the interfering neighbouring access nodes 46 and 46' mean that the available resources cannot be simply divided in half. As a result, while the originating access node forms two coalitions of cardinality two with the interfering neighbouring access nodes 46 and 46', the resources are divided equally amongst the three access nodes. If the nodes 48 and 48' do not have any further restrictions they are allowed to extend their allocations according to the same rules described in the "free rider" situation, exemplified in FIGS. 8a and 8b.

Figure 13:
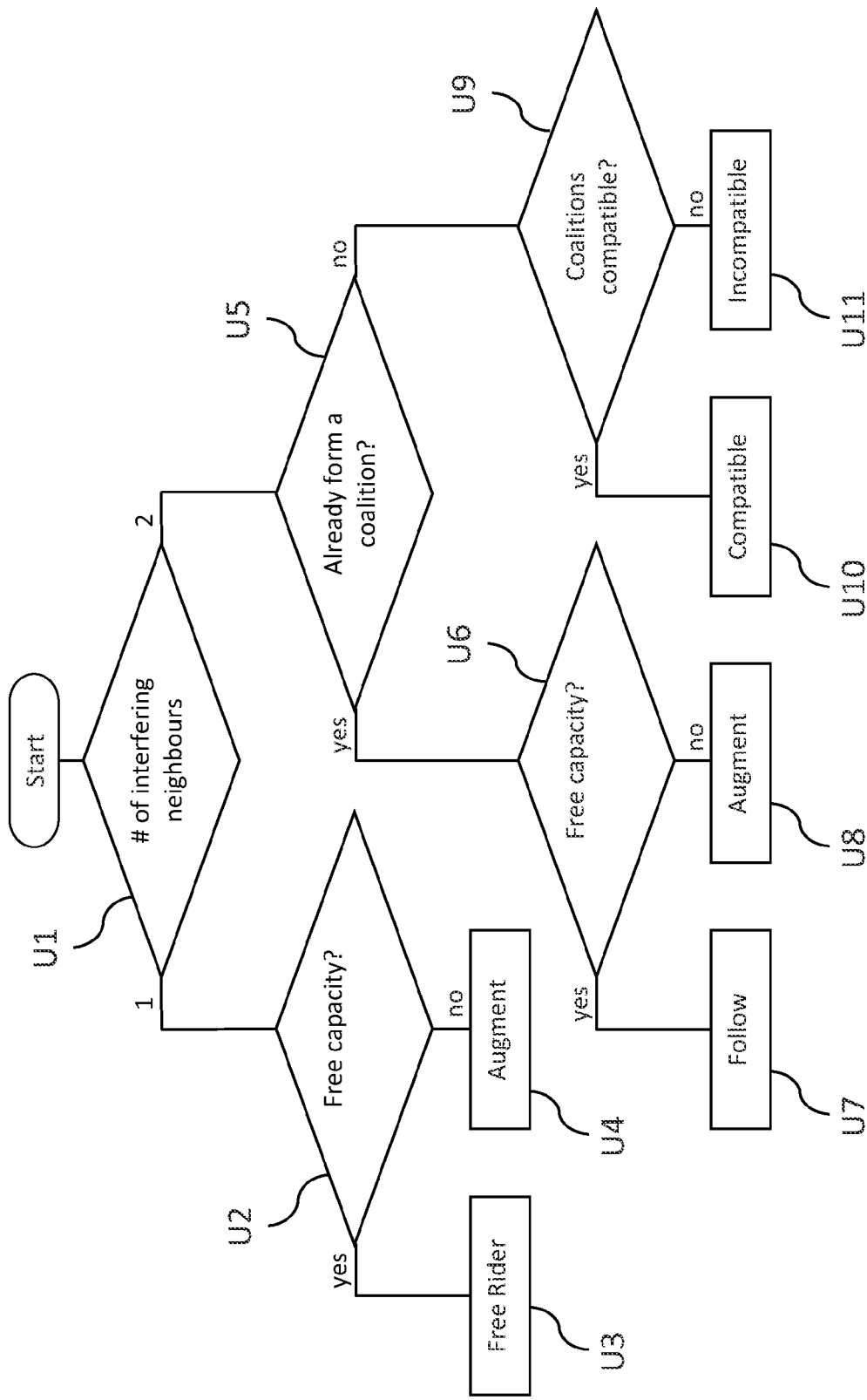
FIG. 13 shows a method of allocating capacity according to embodiments of the invention.

The six scenarios described above are summarized in FIG. 13.

In step U1, a determination is made as to the number of interfering neighbouring access nodes.

If there is only one interfering neighbouring access node, it is determined in step U2 if the potential new coalition with the one interfering neighbouring access node has spare capacity.

If there is spare capacity, then the situation is the free rider situation as described in relation to FIGS. 8a and 8b and shown by U3.

If there is not spare capacity, then the situation is as described in relation to FIGS. 7a and 7b and shown by U4.

If there are two interfering neighbouring access nodes, then in step U5 it is determined whether the two interfering neighbouring access nodes form a coalition.

If the two interfering neighbouring access nodes form a coalition, then in step U6 it is determined whether there is free capacity in that coalition. If there is free capacity, then the situation is like that as described in relation to FIGS. 10a and 10b and referenced by U7. If there is no free capacity, then the situation is like that as described in relation to FIGS. 9a and 9b and referenced by U8.

If in the step U5 it is determined that the two interfering neighbouring access nodes do not form a coalition then in step U9 it is determined whether the two potential new coalitions with the two interfering neighbouring access nodes respectively are compatible.

If it is determined that the two potential new coalitions are compatible, then the situation is like that as described in relation to FIGS. 11a and 11b and referenced by U10. If it is determined that the two potential new coalitions are not compatible, then the situation is like that as described in relation to FIGS. 12a and 12b and referenced by U11.

Figure 14:
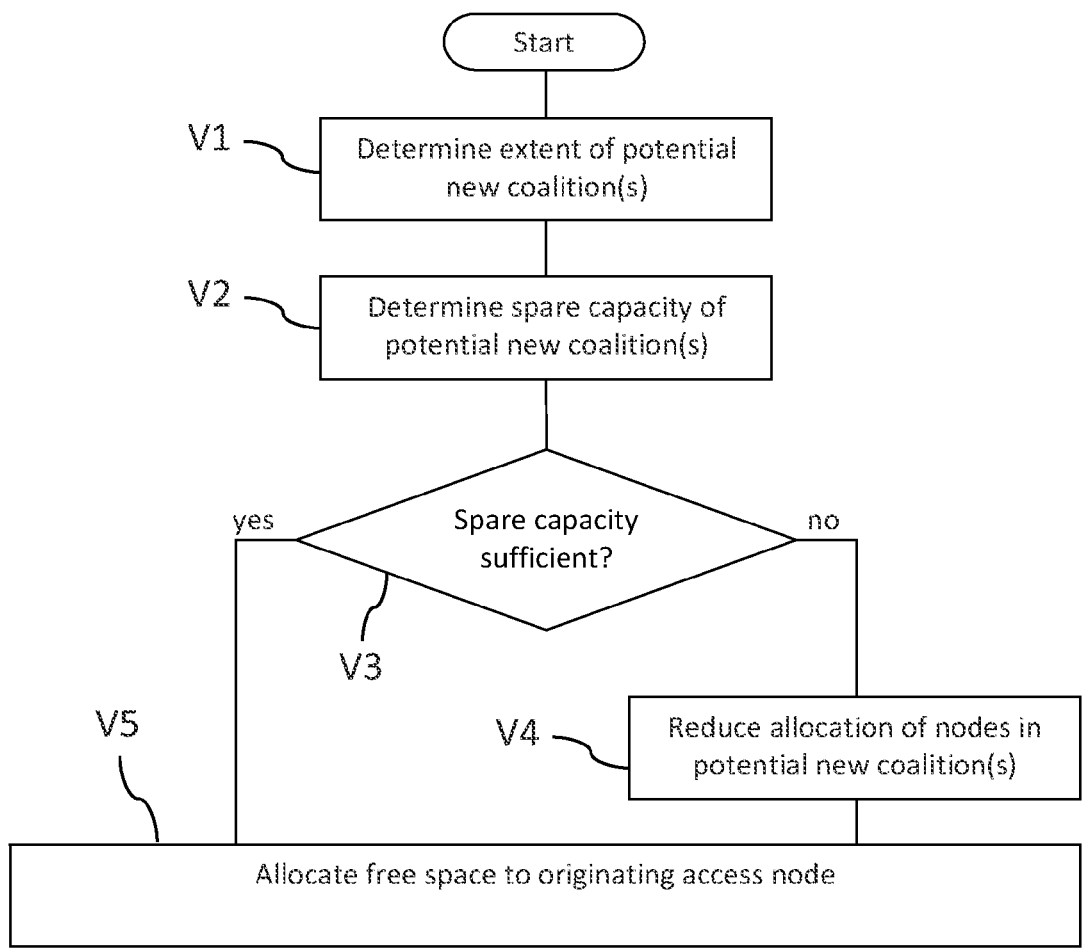
FIG. 14 shows a method of allocating capacity according to embodiments of the invention.

A general method for deciding allocations of resources will be described with reference to FIG. 14. This step can be considered an expansion of Step S8 described in FIG. 5.

In step V1, the originating access node, having received the CFYs from the relevant interfering neighbouring access nodes will determine what potential new coalitions will need to be formed.

When a new coalition is formed, the allocation of resources used by existing access nodes does not necessarily change (see the free-rider situation described above with reference to FIGS. 8a and 8b). However, even if the allocation of interfering neighbouring access nodes does not change, the originating access node may attempt to form new coalitions with them. The formation of new coalitions ensures that subsequent changes to the allocation of the interfering neighbouring access node will not adversely affect the allocation of the originating access node.

In embodiments of the invention, the originating access node will attempt to form coalitions (i.e. potential new coalitions) with all interfering neighbouring access nodes as defined above in relation to FIG. 5. In alternative embodiments, the originating access node will select only a subset of the interfering neighbouring access nodes to form coalitions with.

In step V2, the originating access node determines if there is any free capacity in these potential new coalitions. Free capacity represents that a resource (e.g. a portion of a component carrier) is available to be used by the originating access node. That is, none of the other interfering neighbouring access nodes are already using the resource.

This step can be illustrated with reference to FIGS. 8a and 8b in which the potential new coalition, between originating access node 44 and interfering neighbouring access node 46 (of cardinality two) has only two blocks used (the two blocks used by the interfering neighbouring access node 46). Therefore there is free capacity of the remaining four blocks.

Similarly, in FIGS. 10a and 10b, the potential new coalition between originating access node 44 and the two interfering neighbouring access nodes 46 and 46' (of cardinality three) has free capacity in the two middle blocks, since the two interfering neighbouring access nodes 46 and 46' are prevented from using this capacity by their existing coalition with access node 48.

In step V3, the originating access node determines whether this free capacity, if any, is sufficient. If the free capacity is sufficient, then the originating access node will proceed directly to step V5. If not, then the originating access node will proceed to step V4.

If it is not, then in step V4 the originating access node will deduct capacity from the interfering neighbouring access nodes so as to create free capacity. This deduction of capacity may be done equally (that is each interfering access node has an equal amount of its allocation deducted), as illustrated in, for example, FIGS. 9a and 9b and FIGS. 12a and 12b.

Alternatively, the deduction of capacity may not be equal. An example of this is shown in FIGS. 11a and 11b where the resource blocks are deducted from interfering neighbouring access node 46' only. In this example the resource blocks are not deducted from interfering neighbouring access node 46.

The decision as to how to deduct capacity may take into account may factors. In the example shown in FIGS. 11*a* and 11*b*, the coalition with neighbouring access node 46 already has free capacity. Therefore, to maximise the spectral efficiency of all of the access nodes taken together, the free capacity of the coalition with access node 46 is matched with the deductions in allocation from access node 46'.

Other ways to deduct capacity may be performed. Nevertheless, the result is the creation of free capacity which is common to all of the potential new coalitions. That is the free capacity is unused by all of the interfering neighbouring access nodes. In embodiments in which the shared resources used are portions of component carriers, this would be represented by one or more portions of the component carriers being unused by all of the interfering neighbouring access nodes.

In step V5 the originating access node allocates the free capacity to itself, and informs the interfering neighbouring access nodes of the new coalition(s) and allocations. The free capacity may have been created in step V4 or already present as discussed in step V3.

Examples of where the free capacity is available and allocated to the originating access node are shown in FIGS. 8*a*, 8*b*, 10*a* and 10*b*.

Examples of where there is no available free capacity and therefore deductions in allocations are made are shown in FIGS. 7*a*, 7*b*, 9*a*, 9*b*, 11*a*, 11*b*, 12*a* and 12*b*.

Figure 6:
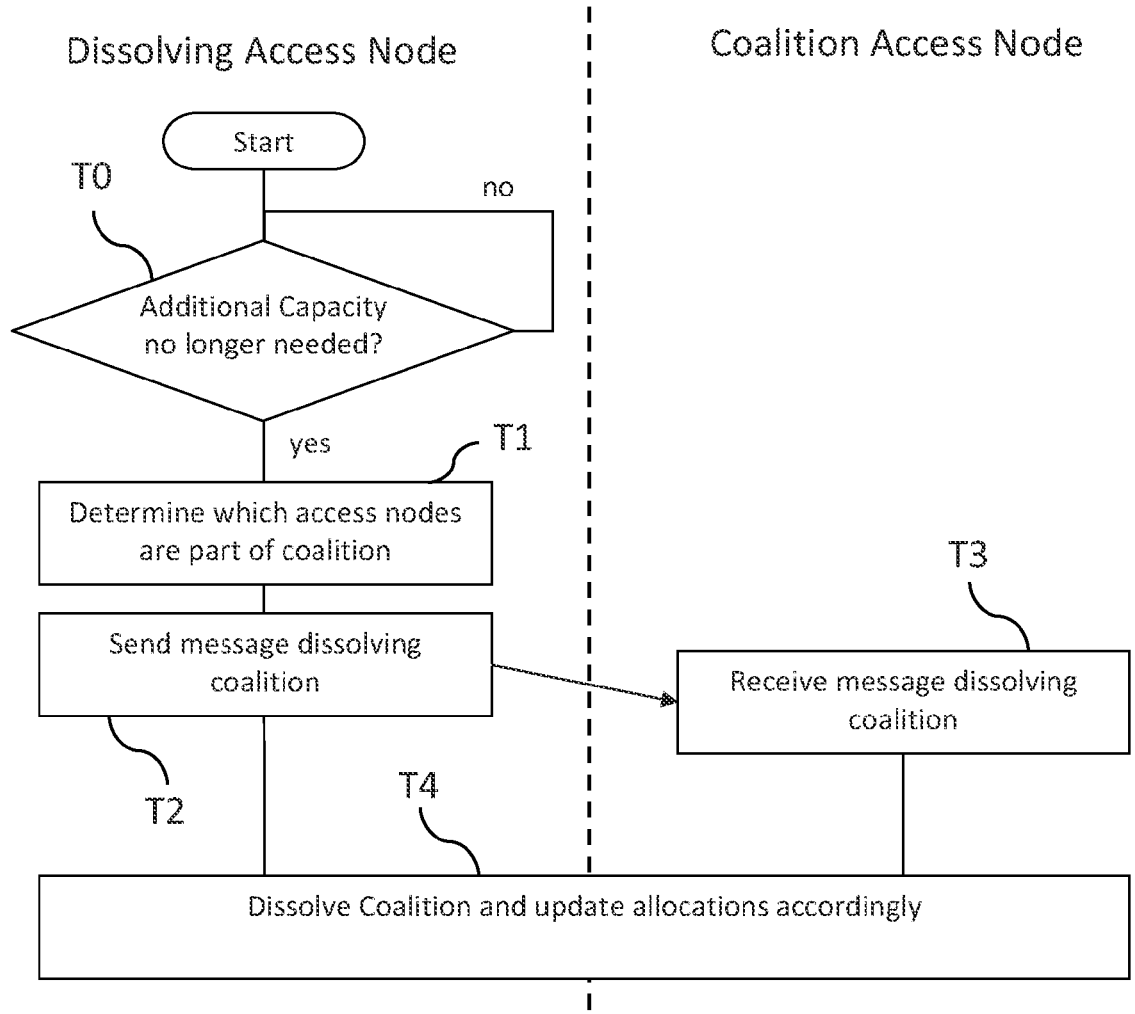
FIG. 6 shows a method of dissolving coalitions according to embodiments of the invention.

A method for dissolving a coalition will now be described with reference to FIG. 6.

The step T0 an access node (henceforth the dissolving access node) determines that the additional capacity is no longer required, that is that one or more of the component carriers used by the dissolving access node is no longer needed based on the traffic at the dissolving access node. This decision block is self looping until the determination is true.

The dissolving access node may be the originating access node as mentioned with reference to FIG. 5, however it will be understood that it might be any access node in the coalition. Equally the coalition access node may represent any access node forming a coalition with the dissolving access node. As before, a single coalition access node is shown, however this may represent more than one access node.

In step T1, having determined that the additional capacity is no longer required, dissolving access node sends a message to the other members of the coalition dissolving the coalition.

In step T2, the message is received by the other members of the coalition.

In step T3, the members of the coalition dissolve the coalition and reallocate their resources accordingly.

The required data processing and functionality of the access node, control entity or any further apparatus described above may be provided by means of one or more processors. The above described functions may be provided by separate processors or by an integrated processor. The data processing may be distributed across several data processing modules. A data processor may be provided by means of, for example, at least one chip or a chipset. Appropriate memory capacity can also be provided in the relevant nodes. An appropriately adapted computer program code product or products may be used for implementing the embodiments, when loaded on an appropriate data processing apparatus, for example in a processor apparatus associated with the base station and/or processing apparatus associated with relay node. The program code product for providing the operation may be stored on, provided and embodied by means of an appropriate carrier medium. An appropriate computer program can be embodied on a computer readable record medium. A possibility is to download the program code product via a data network.

A non-limiting example of mobile architectures where the herein described principles may be applied is known as the Evolved Universal Terrestrial Radio Access Network (E-UTRAN). The eNBs may provide E-UTRAN features such as user plane Radio Link Control/Medium Access Control/Physical layer protocol (RLC/MAC/PHY) and control plane Radio Resource Control (RRC) protocol terminations towards the user devices.

It is noted that whilst embodiments have been described in relation to LTE, similar principles can be applied to any other communication system where resources are shared. Therefore, although certain embodiments were described above by way of example with reference to certain exemplifying architectures for wireless networks, technologies and standards, embodiments may be applied to any other suitable forms of communication systems than those illustrated and described herein.

The embodiments of the invention described above are to serve as example only. It will be evident to the skilled person that many modifications may be made within the scope of the invention.

What is claimed is:

1. A method comprising:
   determining that additional shared component carrier resources are required by a first node, the shared component carrier resources being shared with one or more second nodes;
   determining the identity of at least one of the one or more second nodes with which the first node has a strong interference bond for the shared component carrier resources;
   sending a request to the at least one second node for information relating to the use of the shared component carrier resources;
   receiving a response from the at least one second node, the response comprising information relating to the use of the shared component carrier resources;
   determining, in the first node, the amount of shared component carrier resources allocated; and
   causing at least one allocation message to be sent to the at least one second node, the allocation message indicating that at least a part of the shared component carrier resources used by the at least one second node has been allocated to the first node.

2. The method of claim 1, wherein the first node forms a coalition with the at least one second node based on information sent in the at least one allocation message.

3. The method of claim 1, wherein the response comprises at least one of:
   information relating to what shared component carrier resources are being used by the at least one second node;
   information relating to what shared component carrier resources, used by the at least one second node, may be allocated to the first node; and
   information relating to whether the at least one second node forms a coalition with one or more further nodes.

4. The method of claim 3 further comprising:
   determining based on the response, whether there are free shared component carrier resources which are free to be used by the first node;

wherein, if there are free shared component carrier resources, the at least one allocation message comprises information identifying the free shared component carrier resources.

5. The method of claim 1 further comprising:

receiving information defining interference bonding between the first node and the at least one second node; and storing the received information in a memory, wherein the determining the identity of at least one second node comprises reading information from the memory.

6. The method of claim 5, wherein the received information is received from a communication device with which the first node is able to communicate using the shared component carrier resources.

7. The method of claim 6, wherein an interference bond represents the amount which the signalling associated with the shared component carrier resource and the at least one second access node affects the signalling associated with the shared component carrier resource and the first node.

8. The method of claim 7, wherein a strong interference bond is indicative that the interference bond renders simultaneous use of the shared component carrier resource by the first and the at least one second node less efficient than coordinated use of the shared component carrier resource.

9. The method of claim 8, wherein the shared component carrier resources comprise portions of component carriers.

10. The method of claim 9 wherein the portions of component carriers are orthogonal within the time domain.

11. The method of claim 10, wherein the at least one second node comprises two second nodes and wherein the first node is allocated a first part of the shared component carrier resources, one second node is allocated a second part of the shared component carrier resources, and a further second node is allocated a third part of the shared component carrier resources.

12. The method of claim 1, wherein the strength of the interference bond is calculated using the perceived signal to interference plus noise ratio values.

13. A computer program product comprising a non-transitory computer readable storage medium bearing computer program code embodied therein for use with a computer, the computer program code comprising code for performing:

determining that additional shared component carrier resources are required by a first node, the shared component carrier resources being shared with one or more second nodes;

determining the identity of at least one of the one or more second nodes with which the first node has a strong interference bond for the shared component carrier resources;

sending a request to the at least one second node for information relating to the use of the shared component carrier resources;

receiving a response from the at least one second node, the response comprising information relating to the use of the shared component carrier resources;

determining, in the first node, the amount of shared component carrier resources allocated; and causing at least one allocation message to be sent to the at least one second node, the allocation message indicating that at least a part of the shared component carrier resources used by the at least one second node has been allocated to the first node.

14. An apparatus comprising:
one or more processors; and
one or more memories including computer program code, the one or more memories and the computer program code configured, with the one or more processors, to cause the apparatus to perform the following:

determining that additional shared component carrier resources are required by a first node, the shared component carrier resources being shared with one or more second nodes;

determining the identity of at least one of the one or more second nodes with which the first node has a strong interference bond for the shared component carrier resources;

sending a request to the at least one second node for information relating to the use of the shared component carrier resources;

receiving a response from the at least one second node, the response comprising information relating to the use of the shared component carrier resources;

determining, in the first node, the amount of shared component carrier resources allocated; and causing at least one allocation message to be sent to the at least one second node, the allocation message indicating that at least a part of the shared component carrier resources used by the at least one second node has been allocated to the first node.

15. The apparatus of claim 14, wherein the strength of the interference bond is calculated using the perceived signal to interference plus noise ratio values.

16. The apparatus of claim 14, wherein the first node is configured to form a coalition with the at least one second node based on information sent in the at least one allocation message.

17. The apparatus of claim 14 wherein the first node and the at least one second node comprise eNodeBs.

18. The apparatus of claim 14, wherein the at least one second node comprises two second nodes and wherein the first node is allocated a first part of the shared component carrier resources, one second node is allocated a second part of the shared component carrier resources, and a further second node is allocated a third part of the shared component carrier resources.

19. The apparatus of claim 14, wherein the response comprises at least one of:

information relating to what shared component carrier resources are being used by the at least one second node;

information relating to what shared component carrier resources, used by the at least one second node, may be allocated to the first node; and information relating to whether the at least one second node forms a coalition with one or more further nodes.

20. The apparatus of claim 19, wherein the one or more memories and the computer program code are further configured, with the one or more processors, to cause the apparatus to perform:

determining, based on the response, whether there are free shared component carrier resources which are free to be used by the first node; and wherein, if there are free shared component carrier resources, the at least one allocation message comprises information identifying the free shared component carrier resources.

21. The apparatus of claim 14, wherein the one or more memories and the computer program code are further configured, with the one or more processors, to cause the apparatus to perform:

receiving information defining interference bonding between the first node and the at least one second node; and reading the information from the one or more memories.

22. The apparatus of claim 21, wherein receiving information defining interference bonding between the first node and the at least one second node comprises receiving information from a communication device with which the first node is able to communicate using the shared component carrier resources.

23. The apparatus of claim 14, wherein an interference bond represents the amount which the signalling associated with the shared component carrier resource and the at least one second access node affects the signalling associated with the shared component carrier resource and the first node.

24. The apparatus of claim 14, wherein a strong interference bond is indicative that the interference bond renders simultaneous use of the shared component carrier resource by the first and the at least one second node less efficient than coordinated use of the shared component carrier resource.

25. The apparatus of claim 14, wherein the shared component carrier resources comprise portions of component carriers.

26. The apparatus of claim 25 wherein the portions of component carriers are orthogonal within the time domain.

* * * * *